Patented May 9, 1950

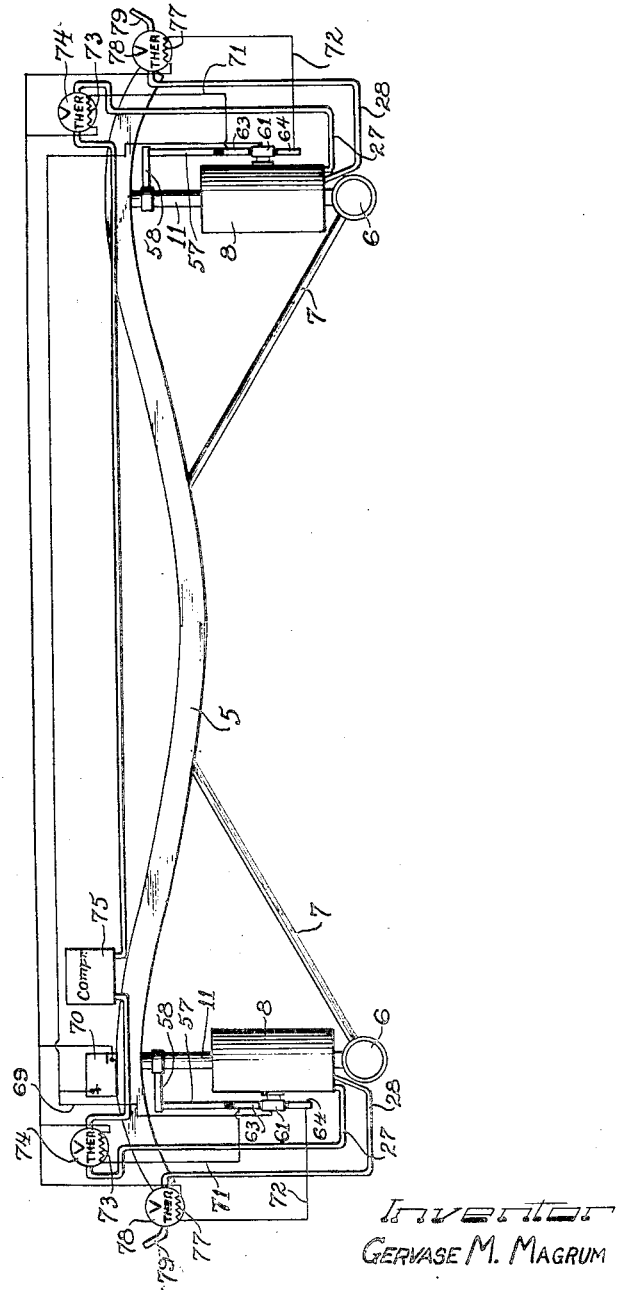

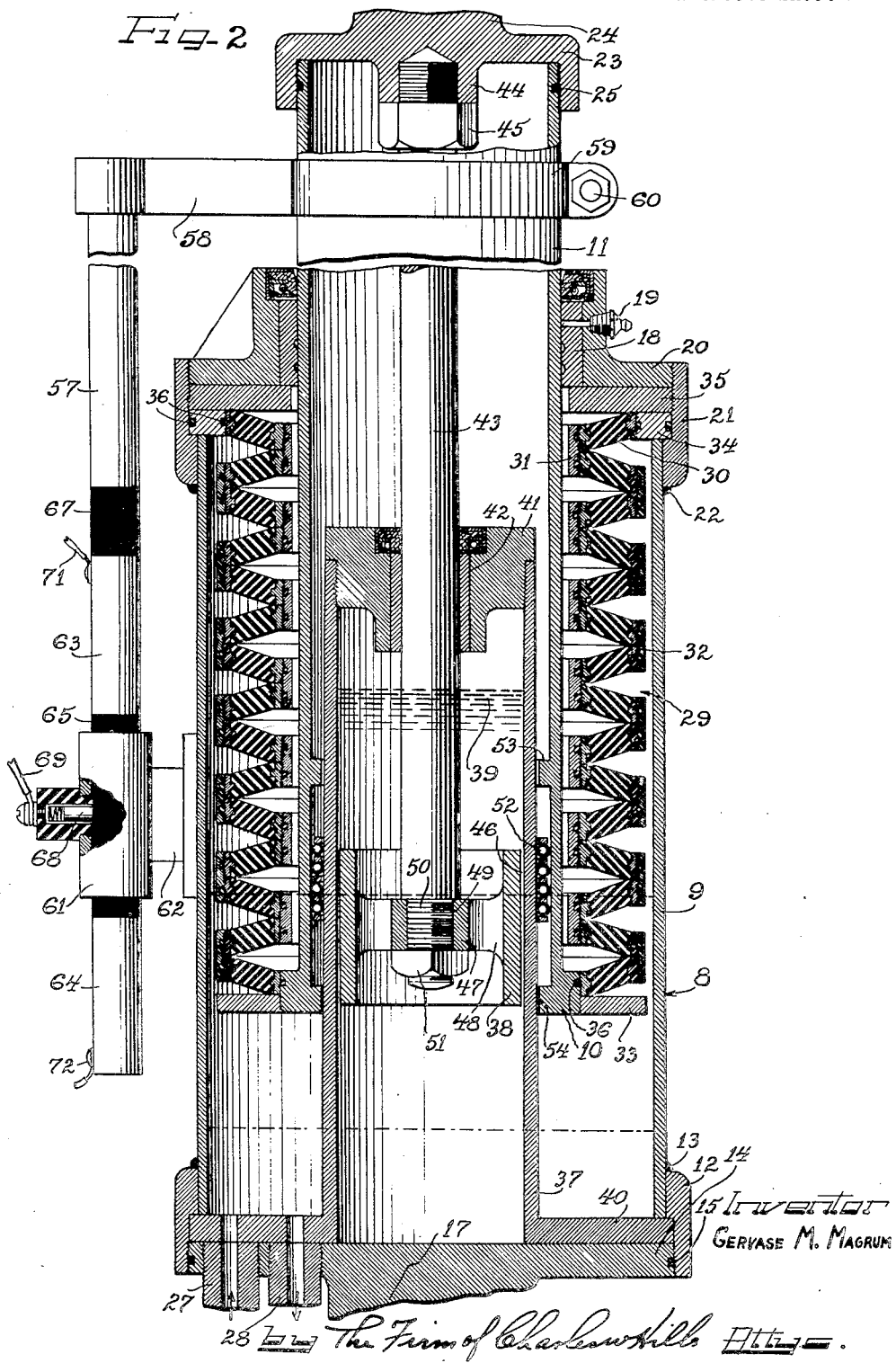

2,506,726

UNITED STATES PATENT OFFICE 2,506,726

PNEUMATIC SUSPENSION FOR MOTOR VEHICLES AND THE LIKE

Gervase M. Magrum, Buffalo, N. Y., assignor to Houdaille-Hershey Corporation, Detroit, Mich., a corporation of Michigan Application January 9, 1946, Serial No. 640,082

6 Claims. (Cl. 267—64)

This invention relates to a novel pneumatic suspension for motor vehicles or the like and more especially pneumatic suspension means which is particularly useful for motor buses and trucks.

As is well known, the usual metallic suspension springs for motor buses and trucks are designed to support the maximum load for which the vehicle is rated. Thus, for any lesser load, the springs react excessively strongly with a resultant deterioration in riding quality since there is a tendency toward increased bouncing for lack of the weight which would modulate the spring action. On the other hand at maximum load or overload the metallic springs become sluggish and therefore lose spring, so that the riding qualities of the vehicle are again deteriorated. Various supplementary and compensating structures have been proposed but have met with only partial success hardly sufficient to warrant the very substantially increased costs added by such devices.

An object of the present invention is to provide a vehicle suspension wherein the springs are of such a character that uniform riding qualities are attained in all stages of loading of the vehicle.

Another object of the invention is to provide a vehicle suspension wherein a plurality of individual spring units are independently adjustable to compensate for variable loading characteristics so as to impart uniform riding qualities to the vehicle throughout the full loading range for the vehicle or any section thereof.

It is also an object of the invention to provide a novel vehicle suspension which is free from liability of overloading.

A further object of the invention is to provide a suspension for motor vehicles and the like in which the variable and unpredictable friction losses and divergences are reduced to the barest minimum.

Still another object of the invention is to provide a new and improved pneumatic vehicle suspension.

Yet another object of the invention is to provide a new and improved vehicle suspension wherein the distance between the chassis and axle structures can be maintained at substantially a predetermined spacing under all conditions of the vehicle from fully loaded to unloaded.

A still further object of the invention is to provide a pneumatic vehicle suspension which dispenses with metallic springs and is adjustable in operation to compensate for variations in the load of the vehicle.

It is another object of the invention to provide a combined pneumatic spring and shock absorber.

An additional object of the invention is to reduce the weight of the spring suspension for vehicles and the like.

Other objects, features and advantages of the present invention will be readily apparent from the following detailed description taken in conjunction with the accompanying two sheets of drawings, in which:

Figure 1 is a schematic layout of a vehicle suspension embodying the features of the present invention; and Figure 2 is a fragmental vertical sectional view through a pneumatic spring structure and control apparatus of the kind adapted for use in the pneumatic suspension system shown in Fig. 1.

A motor vehicle or the like, such as a bus or truck, includes a chassis 5 which supports the body of the vehicle (not shown) and axles 6 carrying the wheels (not shown). Means such as radius rods 7 connect the axles 6 and chassis 5 and permit the axles and chassis to move relatively vertically, that is, toward and away from each other.

According to the present invention pneumatic spring units 8 are mounted between the chassis 5 and the axles 6 for sustaining the chassis on the axles and permitting a certain limited range of relative operational movement thereof in operation while at all times tending to maintain a substantially uniformly spaced relationship between the axles and the chassis. There may be as many of the pneumatic spring units 8 associated with each axle as particular requirements may dictate, and in accordance with certain aspects of the invention may be of any preferred construction. In the present instance a preferred construction for the pneumatic spring units 8 is shown in Fig. 2, comprising a hollow cylindrical casing 9 housing a coaxial, reciprocable pneumatic piston 10 provided with a piston rod 11 projecting from the upper end of the cylinder 9 and adapted for attachment to the chassis 5.

At its lower end the cylinder 9 is provided with an annular axially downwardly projecting flange 12 which may be of a type to encircle the lower margin of the cylinder and is welded thereto permanently as at 13. Threaded into the flange 12 is a bottom closure plate 14 carrying a thread seal 15 to form a fluid tight joint with the attachment flange. A suitable axially projecting connector 17 of any known or preferred construction is adapted for securing the pneumatic spring unit 8 to one of the axles 6.

Means for guiding the piston rod 11 for axial protraction and retraction with the piston 10 comprises a sleeve bearing 18 adapted to be lubricated through a fitting 19 and supported by a cap 20 threadedly secured into an attachment flange 21 encircling the upper margin of the cylinder 9 and permanently secured thereto in fluidtight relation as by welding 22.

For a purpose to be presently described, the piston rod 11 is of tubular cylindrical form. It carries a top closure cap 23 which is provided with a crown extension 24 by which it is adapted to be secured to the chassis 5. By preference the cap 23 is threadedly secured to the piston rod 11 and a thread seal 25 between the opposed threaded surfaces thereof provides a fluidtight joint.

The weight of the associated vehicle acting through the chassis 5, together with any load in the vehicle, tends to cause the piston rod 11 and thereby the piston 10 to be driven into retracted position within the cylinder 9. To counteract this, at least to the extent of maintaining the piston 10 substantially protracted and provide a pneumatic cushion therefor, compressed air is introduced into the cylinder 9 through the bottom closure plate 14 by way of a duct 27. The compressed air acts upon the piston 10 to force the same axially outwardly or upwardly in opposition to the weight and load of the vehicle and provides a compressible air cushion between the piston and the bottom of the cylinder. An increase in load in the vehicle will be reflected by a downward movement of the piston 10 and therewith the chassis 5 as the air is compressed, and this can be compensated for by admitting additional compressed air into the cylinder. On the other hand, lightening of the load will permit the air to expand and force the piston up in the cylinder and thus tends to increase the space between the chassis 5 and the axles 6. This latter condition is adapted to be met by withdrawing a proper amount of air through a bleeder duct 28 opening through the bottom closure cap 14. In this way a substantially balanced spring suspension results and substantially uniform spacing is maintained at all times between the axle and chassis, and due to the compressibility and expansibility of the compressed air, a relatively smooth and uniform spring action is obtained in operation.

It is quite important that there be no leakage of the compressed air from within the cylinder 9, and especially between the cylinder and the piston 10. Due to the relatively high air pressures that will obtain in the cylinder 9, and more especially the often suddenly multiplied pressures encountered during operation of the associated vehicle, the matter of leakproofing presents a substantial problem. Herein this problem is met by the provision of a sealing bellows 29 connected coaxially between the cylinder 9 and the piston 10. This bellows may be constructed substantially according to the disclosure in my copending application Serial No. 636,666, filed Dec. 22, 1945, and avoids the need for packing between the piston and cylinder so that the piston and the cylinder are freely radially spaced for frictionless relative movement. Such a bellows comprises a series of axially aligned diaphragm ring units 30 which have their inner and outer edges secured together by alternate pairs through the medium of inner connecting rings 31 and outer connecting rings 32 to provide the convolutions of the bellows. The connecting rings are preferably formed from metal with the outer rings 32 of smaller outer diameter than the internal diameter of the cylinder 9, while the inner rings have a greater inner diameter than the encircled piston rod 11. The diaphragm bodies of the diaphragm rings 30 are formed from a flexible material such as rubber and are highly pressure resistant although affording adequate flexibility for expansion and contraction of the bellows unit with a minimum of frictional resistance. One end of the bellows 29 is adapted to be secured to the piston 10 as by threading the adjacent endmost diaphragm ring unit 30 into the piston and locking the same in place by a locking ring 33 which is also threaded on to the piston in the nature of a lock nut and provides a lateral flange affording end support for the bellows. The opposite end of the bellows is secured to the upper end of the cylinder 9 by clamping a laterally projecting sealing ring 34 carried by the adjacent endmost diaphragm ring unit 30 against the adjacent edge of the cylinder 9 and into sealing relation with the encircling attachment flange 21 as by means of a clamping plate or ring 35 which in turn is locked in position by the cap 20. All threadedly connected surfaces are pressure sealed as by means of thread seals 36.

In addition to affording a pneumatic spring suspension, the spring unit 8 embodies a self-contained shock absorber in the form of a coaxially mounted tubular cylinder 37 within which a substantially shorter hollow cylindrical piston 38 of only slightly smaller diameter is reciprocable freely during slow relative axial movement of the cylinder 9 and piston 10 but highly resistive to sudden or rapid relative axial motion due to the shear resistance of a viscous fluid film between the wall of the cylinder 37 and the piston 38. For this purpose, a body of viscous fluid 39 is contained in the cylinder 37. The shock absorber cylinder 37 is formed with a lateral base flange 40 by which it is secured in fluidtight relation at the bottom of the cylinder 9 by clamping of the flange 40 against the edge of the cylinder by the bottom closure cap 14. In this instance it will be noted that the bottom cap 14 also serves as the bottom closure for the shock absorber cylinder 37. The upper end of the shock absorber cylinder 37 is closed by a screw cap 41 which carries a concentric sleeve bearing 42 for slidable guiding of a piston rod 43 which projects upwardly through the cap 41 from the piston 38 and is threaded into a depending boss 44 on the closure cap 23 so as to be movable jointly with the spring piston rod 11. A lock nut 45 carried by the piston rod 43 is driven against the inner end of the boss 44.

Since the shock absorber piston 38 is formed as a cylinder of only slightly smaller external diameter than the internal diameter of the cylinder 37, a very narrow cylindrical viscous film gap 46 is provided therebetween. Internally, the piston cylinder 38 is formed to permit relatively free flow of the piston fluid so that there will be no impediment upon the free axial reciprocation of the piston during slow axial movement of the pneumatic piston 10, and is thus provided with a spider 47 affording large longitudinal openings 48. An axial bore 49 in the spider receives a reduced diameter threaded lower terminal portion 50 of the piston rod 43 onto which is threaded a securing nut 51 by which the shock absorber piston 38 is secured fast upon the piston rod 43.

A frictionless spaced concentric relationship of the piston 10 and the piston rod 11 about the shock absorber cylinder 37 is maintained by antifriction means such as an encircling set of ball bearings 52 which are retained against axial displacement beyond certain axial limits by respective upper and lower retaining flanges 53 and 54 projecting radially inwardly from the piston rod 11.

By this radially spaced relationship of the piston 10 and piston rod 11, compressed air can readily enter therein and supplement the cushion of air acting directly on the lower end of the piston 10.

The supplying of compressed air to and the bleeding off of excess air from the pneumatic spring unit 8 may be controlled by the operator of the associated vehicle, but by preference means are provided for accomplishing these functions automatically. To this end, an electrical control system is provided which is automatically responsive to rise and fall of the pneumatic piston 10 within the cylinder 9. As the active control element of this system a rod 57 may be mounted parallel to the piston rod 11 as by connecting the same at its upper end to the piston rod by means of a bracket 58 carrying a clamping eye 59 secured fixedly about the piston rod 11 close to the cap 23 by means of a clamping screw 60. The electrical control rod 57 is disposed in spaced parallel relation to the hydraulic cylinder 9 and is reciprocably slidable through a sleeve 61 mounted by a bracket 62 in fixed spaced relation to the cylinder 9 coaxial with the control rod 57.

The control rod 57 is provided with coaxially aligned upper and lower electrical contact sections 63 and 64 which are separated from one another by a dielectric section 65 and from the upper portion of the rod by a dielectric separator 67. The relative disposition of the contact sections 63 and 64 and the separating dielectric section 65 is such that when the pneumatic piston 10 is within a limited or balanced optimum spring suspension range partially protracted within the pneumatic cylinder 9, the dielectric section 65 is within the sleeve 61 and is engaged by an electrical contact 68 and keeps open an electrical circuit in which the contact is connected. This electrical circuit involves a lead 69 from the electrical contact 68 connected to one terminal on a battery 70 (Fig. 1), and leads 71 and 72 secured to the electrically conducting sections 63 and 64, respectively, of the control rod and to the opposite terminal of the battery 70.

Should the loading of the vehicle increase to the point where compression of the air in the pneumatic spring unit 8 and thus retraction of the piston 10 progresses beyond the optimum spring suspension range, the coincident depression of the control rod 57 carries the dielectric section 65 beyond the contact 68 and brings the electrically conducting section 63 into engagment with the contact so that an electrical circuit is completed through the leads 69 and 71 and the battery 70. This energizes an electrical resistance heater 73 associated with a delayed action thermal switch valve unit 74 located to control the compressed air supply through the duct 27 from a compressor 75. When the thermally responsive valve unit 74 opens the supply duct 27 to the compressor 75, compressed air is delivered to the pneumatic cylinder 9 until the pneumatic piston 10 is forced up to the optimum suspension zone. Thereupon, the electrical heating circuit through the heater 73 is broken by leaving of the electrical conducting section 63 from its contact with the control contact 68 and engagement of the contact by the dielectric section 65. Due to the time delay feature of the thermostatic valve unit 74, the valve will continue to remain open for a short interval after the electrical circuit through the heater 73 has been broken, and this action is predetermined to enable attainment of the optimum suspension position of the pneumatic piston 10. Moreover, the delayed action valve feature renders the control system nonresponsive to pneumatic piston movements or fluctuations of short duration such as are encountered in normal operation and which are not necessarily caused by changes in the loading of the vehicle.

If the vehicle load is materially reduced, so that expansion of the compressed air in the springs 8, or any of them, causes the pneumatic pistons 10 therein to rise substantially above the optimum operating zone, contact will be established between the electrical contact 68 and the electrically conducting section 64 of the electrical control rod associated with the piston of any pneumatic spring. This closes a circuit through the lead 69, the battery 70 and the appropriate lead 72 and energizes a heater 77 operatively associated with a thermal responsive delayed action valve unit 78 in control of the bleeder duct 28. After a predetermined interval of delay, the valve of the unit 78 opens during the continuance of energization of the heater 77 and permits excess compressed air to bleed from the associated pneumatic spring 8 through the bleeder duct 28 and out through a vent 79. Promptly upon separation of the electrical conducting section 64 of the control rod and the electrical contact 68, of course, the energizing circuit for the heater 77 is broken and the latter quickly cooled so that after a brief lag the valve in the unit 78 closes and the pneumatic piston 10 will have attained approximately the preferred operating suspension position or optimum spring condition. Similarly, as in the case of the compressed air supply circuit, the compressed air bleed off circuit is responsive only to definite loading abnormality, and due to the time delay feature of the switch unit 78 will allow momentary fluctuation in the position of the pneumatic piston 10 as will occur during normal operation conditions on the road and otherwise as a result of the spring action.

By way of illustration, the approximate range of normal operating fluctuation of the pneumatic piston 10 is indicated by the high horizontal broken line and the low dot-dash line in Fig. 2. When either of these positions is attained or passed by the pneumatic piston 10 as a result of load conditions, there will, of course, be the automatic balancing reaction as a result of the electrical control circuits. But when the fluctuations in this range are only momentary the delayed action control valves 74 and 78 remain closed.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In combination in a pneumatic suspension, a pneumatic spring unit, means for supplying compressed air to said unit, means for bleeding off excess compressed air from said unit, electrical control circuits including contact means operable in accordance with variable load conditions of the spring unit and delayed action thermally responsive valve means in said circuits in control of said supply and bleed-off means including electrically responsive heating means operable in response to relatively prolonged overload and underload conditions in the pneumatic unit as reflected through said contact means but leaving the valve units relatively unaffected by electrical circuit energization in the momentary variations in the pneumatic spring unit arising in operation.

2. In combination in a pneumatic suspension, a pneumatic spring unit including a cylinder adapted to be secured to the axle of a vehicle and a piston operable in the cylinder and adapted to be secured to the chassis of the vehicle, means for supplying compressed air to the cylinder, means for bleeding off of said compressed air from the cylinder, and means for controlling said supply means and said bleed-off means, including an electrical circuit having a control rod mounted on said piston and movable axially therewith parallel to the cylinder and an electrical contact cooperatively related to said control rod and carried by the cylinder, said electrical control rod having electrically conducting sections separated by a dielectric section, said dielectric section being engaged by the electrical contact in the balanced spring condition of the pneumatic unit and the electrically conducting sections of the rod being moved into engagement with the electrical contact to complete electrical operating circuits for said control means in respectively the overloaded and underloaded conditions of the pneumatic spring unit.

3. In combination in a pneumatic spring unit, a cylinder, a piston operable in said cylinder and having a tubular piston rod opening through the piston, a shock absorber cylinder mounted within the pneumatic cylinder and received within the piston and piston rod, and a shock absorber piston within the shock absorber cylinder and having a closely spaced opposing surface co-operating with the internal surface of the shock absorber cylinder, viscous fluid within the shock absorber cylinder and providing a viscous film of substantial shear strength between the opposed surfaces of the shock absorber piston and cylinder, and a piston rod projecting from said shock absorber piston and carried by the pneumatic piston rod, the shock absorber piston having passage therethrough for substantially free flow of fluid therethrough in reciprocations of the shock absorber piston by the relative movements of the piston rods and the cylinders but the viscous film between said opposed surfaces retarding and damping sudden relative movements by shear resistance.

4. In combination in a pneumatic suspension, a pneumatic spring unit including a cylinder member and a piston member, means for supplying compressed air to the cylinder member, means for bleeding off the compressed air from the cylinder member, means for controlling said supply means and said bleed-off means, including an electrical circuit having a control rod mounted on one of said members and movable therewith and an electrical contact cooperatively related to said rod and carried by the other of said members, said electrical control rod having electrically conducting sections separated by a dielectric section, said dielectric section being engaged by the electrical contact in the balanced spring condition of the pneumatic unit and the electrically conducting sections of the rod being moved into engagement with the electrical contact to complete electrical operating circuits for said control means in respectively the overloaded and underloaded conditions of the pneumatic spring unit.

5. In combination in a pneumatic suspension, a pneumatic spring unit including a cylinder member and a piston member cooperatively related, means for supplying compressed air to the cylinder member, means for bleeding-off said compressed air from the cylinder member, and means for controlling said supply means and said bleed-off means, including an electrical circuit having a control structure mounted on one of said members and movable therewith and an electrical contact cooperatively related to said control structure and carried by the other of said members, said electrical control structure having electrically conducting sections separated by a dielectric section, said dielectric section being engaged by the electrical contact in the balanced spring condition of the pneumatic unit and the electrically conducting sections of the control structure being moved by relative movement of said control structure and said electrical contact into engagement with the electrical contact to complete electrical operating circuits for said control means in respectively the overloaded and underloaded conditions of the pneumatic spring unit.

6. In combination in a pneumatic suspension, a pneumatic spring unit including a cylinder member and a piston member cooperatively related, means for supplying compressed air to the cylinder member, means for bleeding-off said compressed air from the cylinder member, and means for controlling said supply means and said bleed-off means, including an electrical circuit having a control structure mounted on one of said members and movable therewith and an electrical contact cooperatively related to said control structure and carried by the other of said members, said electrical control structure having electrically conducting sections separated by a dielectric section, said dielectric section being engaged by the electrical contact in the balanced spring condition of the pneumatic unit and the electrically conducting sections of the control structure being moved by relative movement of said control structure and said electrical contact into engagement with the electrical contact to complete electrical operating circuits for said control means in respectively the overloaded and underloaded conditions of the pneumatic spring unit, said control means including heat responsive delayed action means responsive to energizations of the electrical circuit whereby to afford a leg in supplying or bleeding off the compressed air to compensate for momentary deflections of the electrical contact from said dielectric section.

GERVASE M. MAGRUM.

REFERENCES CITED

The following references are of record in the file of this patent:

UNITED STATES PATENTS

| Number | Name | Date |
|---|---|---|
| 847,941 | Hayward | Mar. 19, 1907 |
| 1,373,711 | Bourne | Apr. 5, 1921 |
| 1,438,527 | Holmes | Dec. 12, 1922 |
| 1,650,680 | Youse | Nov. 29, 1927 |
| 1,664,510 | Hughes | Apr. 3, 1928 |
| 1,668,669 | Caldwell | May 8, 1928 |
| 2,021,043 | Bedford et al. | Nov. 12, 1935 |
| 2,092,669 | Greve | Sept. 7, 1937 |
| 2,118,443 | McCorkle | May 24, 1938 |
| 2,207,088 | Coleman | July 9, 1940 |

FOREIGN PATENTS

| Number | Country | Date |
|---|---|---|
| 357,111 | Great Britain | Mar. 12, 1930 |